A. GUASCO.
INFLAMMABLE GAS INDICATOR.
APPLICATION FILED FEB. 29, 1912.
1,089,050.
Patented Mar. 3, 1914.
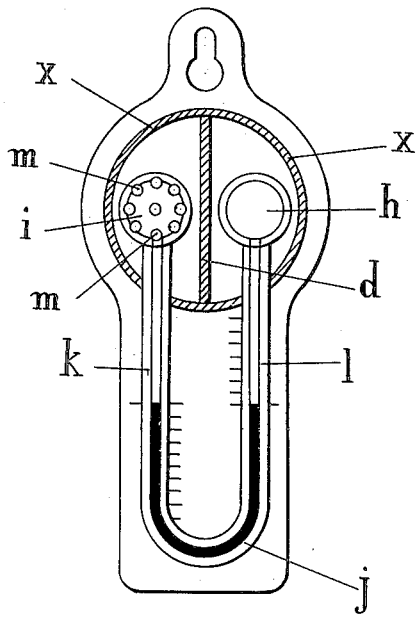
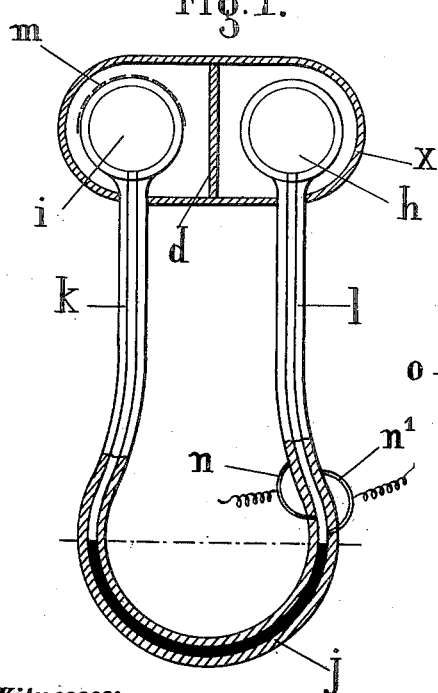
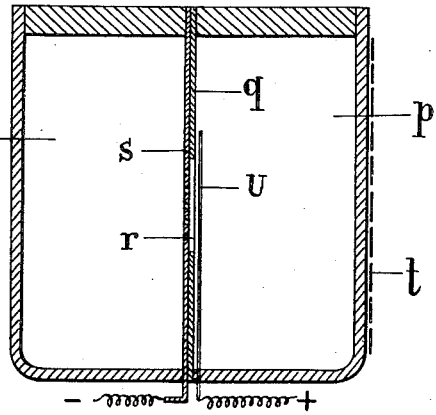
Witnesses:
F. C. Schroder.
A. Reynolds.
Inventor:
André Guasco
per
Lawrence Langner
Attorney.

UNITED STATES PATENT OFFICE.

ANDRÉ GUASCO, OF PARIS, FRANCE.

INFLAMMABLE-GAS INDICATOR.

1,089,050.   Specification of Letters Patent.   Patented Mar. 3, 1914.

Application filed February 29, 1912. Serial No. 680,608.

*To all whom it may concern:*

Be it known that I, ANDRÉ GUASCO, a citizen of the Republic of France, residing at 172 Faubourg St. Denis, Paris, in the French Republic, have invented certain new and useful Improvements in Inflammable-Gas Indicators, of which the following is a specification.

The present invention is based upon the known property of certain metals, such as platinum sponge and the like, of condensing gases such as carbonic oxid, light carbureted hydrogen (or firedamp) with the development of heat. The heat produced being proportionate to the quantity of gas condensed, it follows that a temperature indicator subjected to the action of a catalytic metal will reveal the presence of the said gases in the atmosphere in a manner proportionate to their quantity. Proceeding from this principle, toxico-metric apparatus can be devised which measure at any moment the quantity of deleterious gases introduced into the atmosphere irrespective of the surrounding temperature of these apparatus. These apparatus may merely be indicator-measurers indicator-measurer-annunciators or merely annunciator apparatus.

The indicator-measurer appliances may be constituted by two bulbs united by a U-tube containing a small quantity of liquid, or apparatus based upon the same principle, which give highly amplified indications to facilitate reading. In this case one of the air bulbs is of glass or bare metal while the other carries some fragments of a catalytic metal or alloy, the two branches having a similar internal volume in such a manner that the two columns of air are evenly balanced.

The indicator-measurer-annunciator appliances may be constituted either by an apparatus with two bulbs and U-shaped tube or by the combination of two metallic thermometers of the Breguet or Richard or other types.

Other apparatus which simply serve as annunciators may be established upon the principle of the expansion of the air in two separate chambers of equal volume, one of which is subjected to the action of a catalytic metal. In order that these apparatus may act efficiently and in order to render them highly sensitive it is absolutely indispensable that the two bulbs or receptacles of any kind which constitute the two air reservoirs should be completely insulated from the outer air (contrary to what is the case with Leslie's differential thermometer with which it is analogous as regards form only) in order that the variations of the ambient temperature may not exert any influence upon one or other of the two bulbs; contrary to what is the case with all differential apparatus the main function of the apparatus is not to experience any influence from variations of any kind in the external temperatures but to act only under the influence of the heat produced by the platinum brought into contact with the combustible gases. It is therefore necessary to insulate the liquid or air bulbs from the atmosphere and with this object they are inclosed in a box of wood, ebonite, fiber or other material one wall of which is permeable in such a manner that they are always located in the same medium, that is to say, exactly at the same temperature, which cannot be obtained when these bulbs are freely exposed to the atmosphere. Furthermore, the permeable wall of the box, which may be of asbestos, for example, permits of endosmose in allowing the combustible gases to pass readily in separating them from the air, the result of which is to render the apparatus highly sensitive because in these conditions the dose of toxic gases will already be considerable in the apparatus while they are still highly rarefied in the ambient atmosphere.

Several embodiments of the invention are illustrated by way of example in the accompanying drawing, in which:—

Figure 1 represents an indicator-measurer constituted by two bulbs united by a U-tube. Fig. 2 shows an annunciator of the same type. Fig. 3 is a vertical section of an annunciator without bulbs.

The arrangements shown in Fig. 1 is formed by two glass or metal bulbs $h$ and $i$ united by a tube $j$ containing a certain quantity of liquid the level of which is the same for the two branches $k$ and $l$ which together with the bulbs $h$ and $i$ are exactly similar in volume. The bulb $h$ is an ordinary glass or bare metal bulb while the bulb $i$ carries a few fragments $m$ of catalytic metal or alloy. The tube bulbs of this apparatus are inclosed in an insulating box $x$ of any suitable form of wood, ebonite, fiber or the like with a wall of asbestos or other porous material permitting of endosmose in order to facilitate the passage of the gases in separating them from the air. These gases coming into contact with the bulb $i$ in this form contribute to rendering the apparatus more sensitive.

If toxic or combustible gas is contained in the medium in which the apparatus is located the air contained in the bulb $h$ will remain at the temperature of the medium in which it is inclosed while the bulb $i$ which is covered with platinum sponge for example will rapidly assume a higher temperature. The air contained in this bulb becoming heated, destroys the equilibrium of the two columns and in expanding forces the liquid column from the branch $k$ into the branch $l$ to a greater or less extent according to the quantity of toxic gases existing in the medium in which the apparatus is immersed.

The difference of level of the liquid between the branch $k$ and the branch $l$ will be relatively large because for a displacement of 2 mm. for example in the branch $k$, this difference will be amplified to 4 mm. in the branch $l$. It is therefore possible to arrange upon the support of the apparatus beside the branch $k$ graduations marked in any suitable manner such for example as "normal atmosphere" "traces of gas" "danger of asphyxia", "death" and so forth. For scientific apparatus, mathematical graduations may be provided for exactly measuring the combustible gases introduced into the atmosphere.

The apparatus just described can be utilized as an annunciator as shown in Fig. 1.

As the level of the liquid does not vary seeing there is no mass of mercury it will be understood that it is possible to arrange in the branch $l$ the volume of which is the same as that of the branch $k$, two wires $n$ and $n'$ with which the liquid ascending in the branch $l$ will come into contact under the influence of the expansion produced by the heat of the bulb $i$ covered with catalytic metal when toxic or inflammable gases are contained in the space in which the apparatus is arranged. The circuit is thus closed, actuating an annunciator bell.

As for the apparatus described in Fig. 2, the two bulbs $h$ and $i$ are inclosed in an insulating box $x$ with a wall which is porous for endosmosis.

Fig. 3: The apparatus represented in Fig. 3 is one which is based upon the same principle as that in Figs. 1 and 2 without the employment of liquid but comprising two air chambers one of which is subjected to heat produced by a catalytic metal or alloy. Like the bulbs of the apparatus shown in Figs. 1 and 2 these two chambers are insulated from the air by a casing of any suitable kind with a permeable wall for endosmose. It is constituted by a chamber containing air which is divided into two compartments $o$ and $p$ by a partition $q$ of insulating material; this partition should be thin and rigid and perforated with an aperture $r$.

Upon one of the faces of the partition $q$ there is arranged a sheet of metal $s$ (of copper for example) perforated with holes arranged opposite the aperture $r$ and which is connected with the circuit of an electric annunciator. A thin metallic membrane $u$ soldered to a wire connected with the circuit, is positioned close to the partition $q$ on that side thereof which faces the compartment $p$, which is subject to the action of the catalytic metal $t$ arranged on its outer wall.

If the air of the medium in which the apparatus is arranged contains toxic gases the air contained in the chamber $p$ will expand and press the metallic membrane $u$ against the sheet of copper $s$ thus closing the circuit which will cause an electric bell to act.

Contrary to what is the case with known differential apparatus, the apparatus shown in Figs. 1 to 3 do not give any displacement either of the liquid in the U-tube or of the membrane when there are variations of the external temperature whatever these variations may be; they only indicate differences of temperature when the platinum bulb is subjected to heating arising from condensation of gases by the platinum.

*Remarks.*—As the toxic gases always accumulate in proximity to the ceiling their presence in a room or the like can be ascertained before they reach the lower strata by fixing the box containing the bulbs in as high a position as possible; these bulbs are connected by convenient tubes with the two branches of a U-tube.

What I claim and desire to secure by Letters Patent of the United States is:—

1. Toximetric apparatus for determining the presence in the air of toxic or inflammable gases comprising, in combination, two bulbs united by a U-tube containing a small quantity of liquid, a catalytic metal surrounding one of said bulbs, and an insulating box surrounding said bulbs and provided with a wall of porous material permitting of endosmose in allowing the combustible gases to pass readily in separating them from the air.

2. Toximetric apparatus for determining the presence in the air of toxic or inflammable gases comprising, in combination, two bulbs united by a U-tube containing a small quantity of liquid, a catalytic metal surrounding one of said bulbs, an insulating box surrounding said bulbs and provided with a wall of porous material permitting of endosmose in allowing the combustible gases to pass readily in separating them from the air, and two wires in the branch of the uncovered bulb adapted to close an electric circuit by their contact with the liquid ascending in this branch under the influence of the expansion of the air contained in the bulb covered with catalytic metal, when the apparatus is immersed in a medium containing toxic or inflammable gases.

In testimony whereof I affix my signature in presence of two witnesses.

ANDRÉ GUASCO.

Witnesses:
 MAURICE PICARD,
 LUCIEN MEMMINGER.